(12) United States Patent
McKenney et al.

(10) Patent No.: US 7,689,789 B2
(45) Date of Patent: *Mar. 30, 2010

(54) READ-COPY UPDATE GRACE PERIOD DETECTION WITHOUT ATOMIC INSTRUCTIONS THAT GRACEFULLY HANDLES LARGE NUMBERS OF PROCESSORS

(75) Inventors: Paul E. McKenney, Beaverton, OR (US); Paul F. Russell, Queanbeyan (AU); Dipankar Sarma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/167,099

(22) Filed: Jul. 2, 2008

(65) Prior Publication Data

US 2008/0288749 A1 Nov. 20, 2008

Related U.S. Application Data

(63) Continuation of application No. 10/974,514, filed on Oct. 27, 2004, now Pat. No. 7,454,581.

(51) Int. Cl.
*G06F 12/00* (2006.01)
*G06F 12/12* (2006.01)

(52) U.S. Cl. ............... 711/159; 711/141; 711/147; 707/206

(58) Field of Classification Search ............ 711/141, 711/147, 159; 707/206
See application file for complete search history.

(56) References Cited

U.S. PATENT DOCUMENTS

| 4,685,082 | A | 8/1987 | Cheung et al. |
| 5,727,209 | A | 3/1998 | Slingwine |
| 6,311,289 | B1 | 10/2001 | Holmberg |
| 6,405,201 | B1 | 6/2002 | Nazari |
| 6,490,671 | B1 | 12/2002 | Frank et al. |
| 6,502,165 | B1 | 12/2002 | Kishi et al. |
| 7,454,581 | B2 * | 11/2008 | McKenney et al. ......... 711/159 |

(Continued)

OTHER PUBLICATIONS

PCT ISA, "International Search Report and Written Opinion of the International Searching Authority," Mar. 30, 2006, 10 pages, PCT Application No. PCT/EP2005/055240.

(Continued)

*Primary Examiner*—Matt Kim
*Assistant Examiner*—Michael C Krofcheck
(74) *Attorney, Agent, or Firm*—Walter W. Duft

(57) ABSTRACT

A method, system and computer program product for avoiding unnecessary grace period token processing while detecting a grace period without atomic instructions in a read-copy update subsystem or other processing environment that requires deferring removal of a shared data element until pre-existing references to the data element are removed. Detection of the grace period includes establishing a token to be circulated between processing entities sharing access to the data element. A grace period elapses whenever the token makes a round trip through the processing entities. A distributed indicator associated with each processing entity indicates whether there is a need to perform removal processing on any shared data element. The distributed indicator is processed at each processing entity before the latter engages in token processing. Token processing is performed only when warranted by the distributed indicator. In this way, unnecessary token processing can be avoided when the distributed indicator does not warrant such processing.

21 Claims, 11 Drawing Sheets

U.S. PATENT DOCUMENTS

2002/0078307 A1    6/2002    Zahir
2003/0110232 A1    6/2003    Chen et al.

OTHER PUBLICATIONS

Paul E. McKenney et al., "Read-Copy Update," [Online] Jul. 2002, 28 pages.

A. Arcangeli et al., "Using Read-Copy Update Techniques for System V IPC in the Linux 2.5 Kernel," 2003, pp. 297-309, Freenix Track 2003 Usenix Annual Technical Conference, Proceedings Usenix Assoc. Berkeley, CA, USA.

B. Gamsa et al., "Tornado: Maximizing locality and concurrency in a shared memory multiprocessor operating system," 1998, pp. 87-100, Operating Systems Review ACM USA.

P. McKenney et al., "Read Copy Update," 2002 Ottawa Linux Symposium (Jul. 2002), 28 pages.

P. McKenney et al., "Using RCU in the Linux 2.5 Kernel," Linux Journal (Oct. 2003), 11 pages.

P. McKenney et al., "Scaling dcache with RCU," Linux Journal (Jan. 1, 2004), 12 pages.

P. McKenney, "Exploiting Deferred Destruction: An Analysis of Read-Copy-Update Techniques in Operating System Kernels," Jul. 2004, pp. 83-90, 108-132.

* cited by examiner

READ-COPY UPDATE GRACE PERIOD DETECTION WITHOUT ATOMIC INSTRUCTIONS THAT GRACEFULLY HANDLES LARGE NUMBERS OF PROCESSORS

This application is a continuation under 35 U.S.C. 120 of application Ser. No. 10/974,514, filed Oct. 27, 2004, entitled "Read-Copy Update Grace Period Detection Without Atomic Instructions That Gracefully Handles Large Numbers of Processors."

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns improvements to a mutual exclusion mechanism known as "read-copy update," in which lock-free data read operations run concurrently with data update operations.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring a spinlock, allocating new memory for B', copying the contents of B to B', modifying B' as needed, updating the pointer from A to B so that it points to B', and releasing the spinlock. All subsequent (post update) readers that traverse the linked list, such as the reader r2, will thus see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring." The contents of U.S. Pat. No. 5,727,209 are hereby incorporated herein by this reference.

The callback processing technique contemplates that an updater of a shared data element will perform the initial (first phase) data update operation that creates the new view of the data being updated, and then specify a callback function for performing the deferred (second phase) data update operation that removes the old view of the data being updated. The updater will register the callback function (hereinafter referred to as a "callback") with a read-copy update subsystem so that it can be executed at the end of the grace period. The read-copy update subsystem keeps track of pending callbacks for each processor and monitors per-processor quiescent state activity in order to detect when each processor's current grace period has expired. As each grace period expires, all scheduled callbacks that are ripe for processing are executed.

The successful implementation of read-copy update requires efficient mechanisms for deducing the length of a grace period. One important class of implementations passes a grace period token from one processor to the next to signify that the end of a grace period has been reached for the processor owning the token. The grace period token can be a distinguished value that is expressly passed between processors. However, two memory write accesses are required when using this technique—one to remove the token from its current owner and another to pass the token to its new owner. A more efficient way of handling the grace period token is to pass it implicitly using per-processor quiescent state counters and associated polling mechanisms. According to this technique, whenever a processor passes through a quiescent state, its polling mechanism inspects the quiescent state counter of a neighboring processor to see if the neighbor's counter has changed since the current processor's last grace period. If it has, the current processor determines that a new grace period has elapsed since it last had the token. It executes its pending callbacks and then changes its quiescent state counter to an incrementally higher value than that of its neighbor. The next processor then sees this processor's changed counter value, processes its pending callbacks, and increments its own counter. This sequence continues, with the grace period token ultimately making its way through all of the processors in round-robin fashion.

Regardless of how the grace period token is implemented, each processor only processes callbacks when it receives the token. Insofar as the grace period token must travel through all other processors before reaching the processor that is the current holder, the current processor is always guaranteed that the other processors have passed through a quiescent state since the last time the current processor owned the token, thus ensuring that a grace period has elapsed.

Because grace period detection using token manipulation consumes processor cycles as the processors pass through their quiescent states, it is undesirable to incur such overhead unless there are pending callbacks in the read-copy update subsystem. For that reason, efficient token-based read-copy update implementations use a shared indicator (i.e., a global variable) that is tested before grace period token processing to determine if the read-copy update subsystem is idle. If it is, the grace period token does not need to be passed and the associated processing overhead can be avoided. The shared indicator is typically a count of the number of pending callbacks. Whenever a callback is registered at a given processor, the shared indicator is manipulated to reflect the new callback. Thereafter, when that callback is processed, the shared indicator is again manipulated to reflect the removal of the callback from the read-copy update subsystem.

A disadvantage of using a shared indicator to test for the existence of pending callbacks is that atomic instructions, locks or other relatively expensive mutual exclusion mechanisms must be invoked each time the shared indicator is manipulated in order to synchronize operations on the indicator by multiple processors. Moreover, conventional hardware caching of the shared indicator by each processor tends to result in communication cache misses and cache line bouncing. In the case of a bitmap indicator, a further disadvantage is that a large number of processors cannot be gracefully accommodated.

It is to solving the foregoing problems that the present invention is directed. In particular, what is required is a new read-copy update grace period detection technique that avoids unnecessary grace period token processing without incurring the overhead of a shared indicator of pending callback status.

SUMMARY OF THE INVENTION

The foregoing problems are solved and an advance in the art is obtained by a method, system and computer program product for avoiding unnecessary grace period token processing while detecting a grace period without atomic instructions in a read-copy update subsystem or other processing environment that requires deferring removal of a shared data element until pre-existing references to the data element are removed. Grace period detection includes establishing a token to be circulated between processing entities sharing access to the shared data element. A grace period can be determined to elapse whenever the token makes a round trip through the processing entities. A distributed indicator is associated with each of the processing entities that is indicative of whether there is a need to perform removal processing on the data element or on other data elements shared by the processing entities (e.g., whether there are pending callbacks warranting callback processing if the invention is implemented in a callback-based read-copy update system). The distributed indicator is processed at each of the processing entities before token processing is performed at the processing entities. Token processing is performed at the processing entities only when warranted by the distributed indicator. In this way, unnecessary token processing can be avoided when the distributed indicator does not warrant such processing.

In exemplary embodiments of the invention, the distributed indicators are stored as local variables in the cache memories associated with the processing entities (and replicated from one cache memory to another during the course of processing via conventional cache coherence mechanisms). In such embodiments, the distributed indicators can represent different kinds of information depending on design preferences. For example, the distributed indicators can alternatively represent the number of processing entities that have pending requests to perform updates to data elements shared by the processing entities, the total number of updates, or a bitmap identifying the processing entities having pending update requests.

The propagation of changes made to the distributed indicators by the various processing entities can also be performed in different ways according to design preferences. In exemplary embodiments, the processing entities periodically consult a distributed indicator maintained by a neighboring processing entity, and adjust the indicator as necessary to reflect changes in data element removal request activity (e.g., callback registrations) at the current processing entity. Whether there has been a change in data element removal request activity can include determination of various factors, such as whether there are a threshold number of pending data element removal requests at one of the processing entities to warrant circulation of the token. Alternatively, such determination could be based on whether there are any pending data element removal requests at one of the processing entities.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1A:
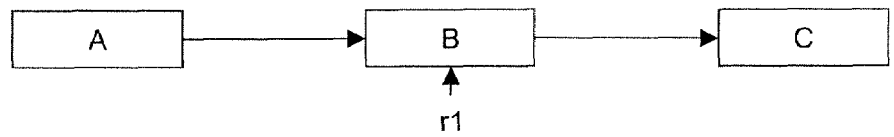
FIGS. 1A-1D are diagrammatic representations of a linked list of data elements undergoing a data element replacement according to a conventional read-copy update mechanism.
Figure 1B:
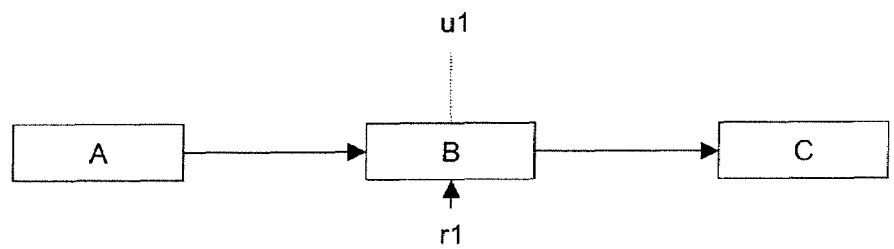
Figure 1C:
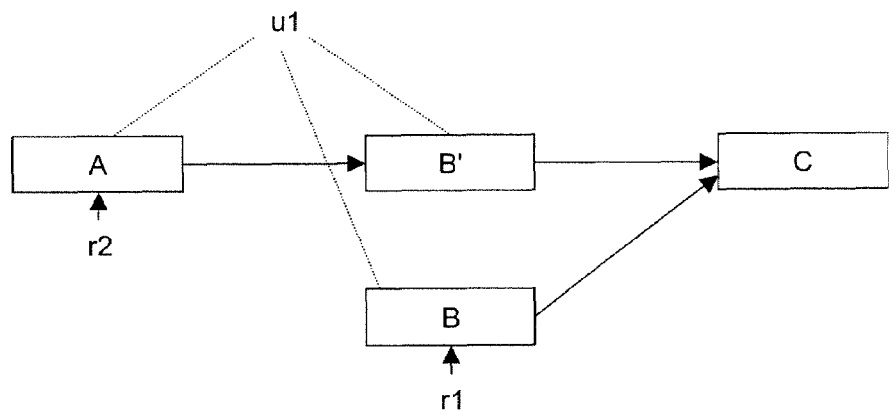
Figure 1D:
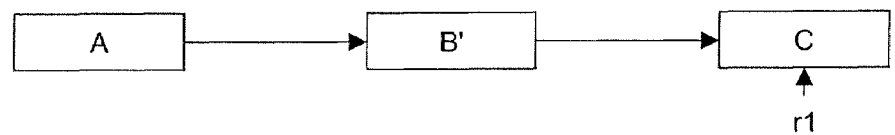
Figure 2A:
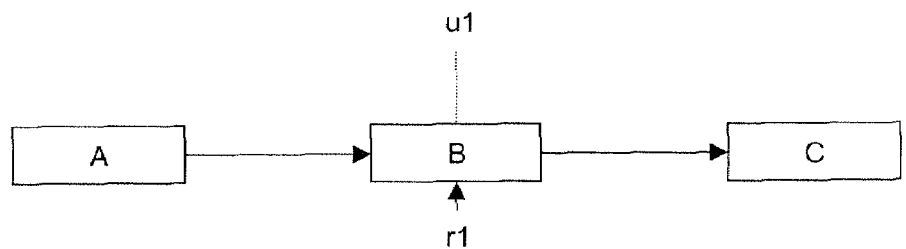
FIGS. 2A-2C are diagrammatic representations of a linked list of data elements undergoing a data element deletion according to a conventional read-copy update mechanism.
Figure 2B:
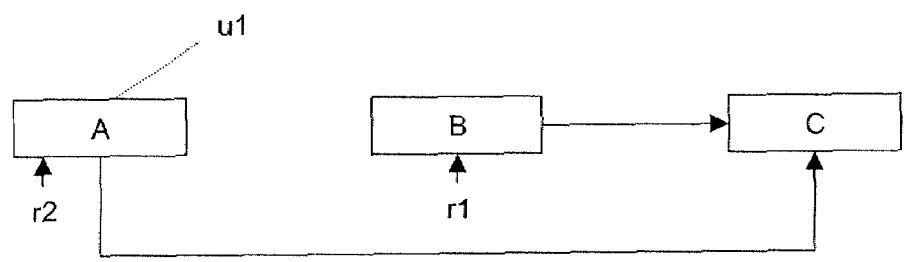
Figure 2C:
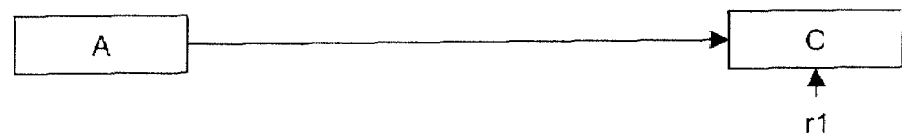
Figure 3:
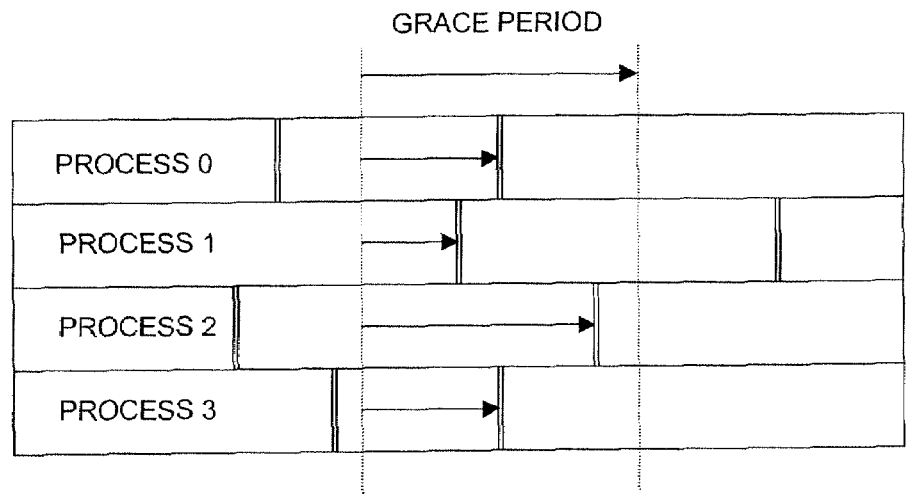
FIG. 3 is a flow diagram illustrating a grace period in which four processes pass through a quiescent state.
Figure 4:
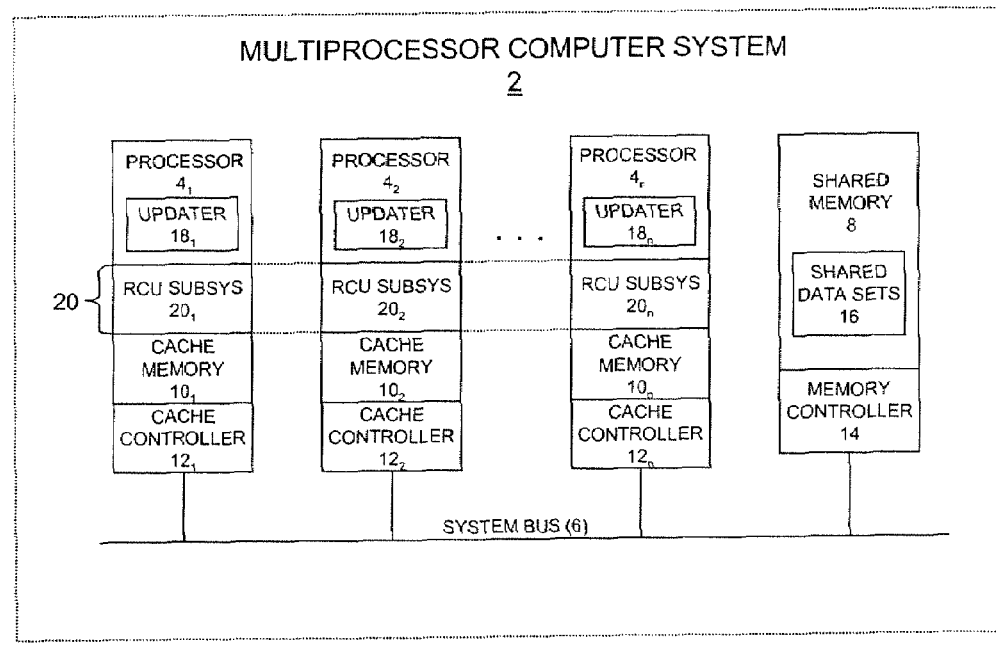
FIG. 4 is a functional block diagram showing a multiprocessor computing system that represents one exemplary environment in which the present invention can be implemented.

Turning now to the figures, wherein like reference numerals represent like elements in all of the several views, FIG. 4 illustrates an exemplary computing environment in which the present invention may be implemented. In particular, a symmetrical multiprocessor (SMP) computing system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment.

It is further assumed that update operations executed within kernel or user mode processes, threads, or other execution contexts will periodically perform updates on shared data sets 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ are programmed to implement a read-copy update (RCU) subsystem 20, as by periodically executing respective read-copy update instances $20_1, 20_2 \ldots 20_n$ as part of their operating system functions. Although not illustrated in the drawings, it will be appreciated that the processors $4_1, 4_2 \ldots 4_n$ also execute read operations on the shared data sets 16. Such read operations will typically be performed far more often than updates, insofar as this is one of the premises underlying the use of read-copy update.

Figure 5:
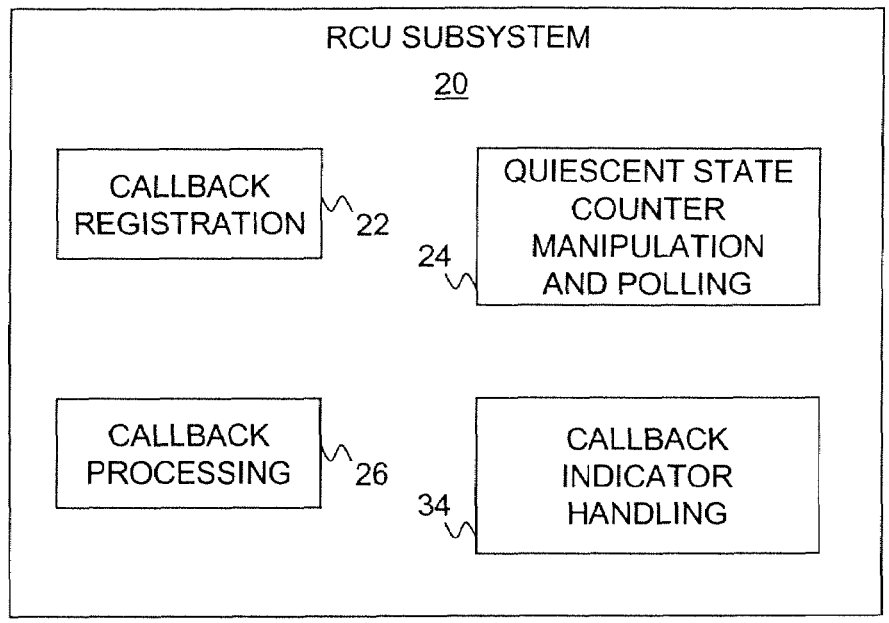
FIG. 5 is a functional block diagram showing a read-copy update subsystem implemented by each processor in the multiprocessor computer system of FIG. 4.

As shown in FIG. 5, each of the read-copy update subsystem instances $20_1, 20_2 \ldots 20_n$ includes a callback registration component 22. The callback registration component 22 serves as an API (Application Program Interface) to the read-copy update subsystem 20 that can be called by the updaters $18_2 \ldots 18_n$ to register requests for deferred (second phase) data element updates following initial (first phase) updates performed by the updaters themselves. As is known in the art, these deferred update requests involve the removal of stale data elements, and will be handled as callbacks within the read-copy update subsystem 20. Each of the read-copy update subsystem instances $20_1, 20_2 \ldots 20_n$ additionally includes a quiescent state counter manipulation and polling mechanism 24 (or other functionality for passing a token), together with a callback processing system 26. Note that the functions 24 and 26 can be implemented as part of a kernel scheduler, as is conventional.

The cache memories $10_1, 10_2 \ldots 10_n$ associated with the processors $4_1, 4_2 \ldots 4_n$ respectively store quiescent state counters $28_1, 28_2 \ldots 28_n$ and one or more callback queues $30_1, 30_2 \ldots 30_n$. The quiescent state counters $28_1, 28_2 \ldots 28_n$ are managed by the counter manipulation and polling mechanism 24 (a token manipulator) for the purpose of passing a grace period token among the processors $4_1, 4_2 \ldots 4_n$. It will be appreciated that if some other form of token passing is used, the quiescent state counters $28_1, 28_2 \ldots 28_n$ will not be required. The callback queues $30_1, 30_2 \ldots 30_n$ are appended (or prepended) with new callbacks as such callbacks are registered with the callback registration component 22. The callback processing system 26 is responsible for executing the callbacks referenced on the callback queues $30_1, 30_2 \ldots 30_n$, and then removing the callbacks as they are processed.

Figures 7, 8:
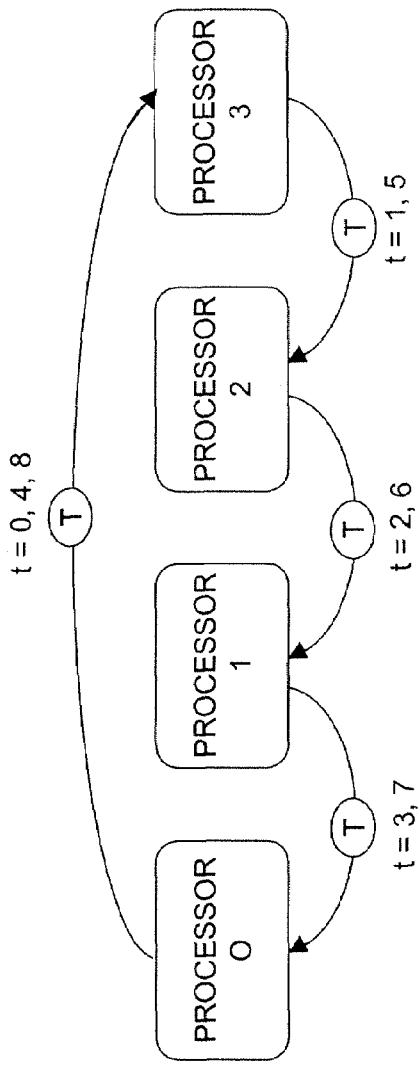
FIG. 7 is a table showing exemplary quiescent state counter values in a hypothetical four-processor data processing system implementing read-copy update.
FIG. 8 is a functional block diagram showing the four processors of FIG. 7 as they pass a grace period token from time to time during read-copy update processing.

FIGS. 7 and 8 illustrate how the quiescent state counters $28_1, 28_2 \ldots 28_n$ can be used to pass a grace period token between processors in an exemplary four processor system as the processors pass through quiescent states. Each column in FIG. 7 shows exemplary values for all processor quiescent state counters at a given point in time. The shaded cells indicate that the corresponding processor is the owner of the grace period token. In each case, the owner is the processor whose counter has the smallest value and whose neighbor has a counter value representing a discontinuity relative to the token owner's counter value.

The token passing technique represented by FIGS. 7 and 8 is known in the art and these figures are therefore labeled as "Prior Art." As described by way of background above, a given processor checks to see if it owns the grace period token by referring to the quiescent state counter maintained by one of neighbors (e.g., that processor whose processor number is one greater than the current processor, modulo (%) the number of processors). If the neighbor's quiescent state counter has not changed since the current processor's last grace period (i.e., there is no discontinuity in the counter values), the current processor determines that a new grace period has not yet elapsed and resumes normal processing. If the neighbor's counter has changed since the current processor's last grace period (i.e., there is a discontinuity in the counter values), the current processor determines that a new grace period has elapsed. It processes its pending callbacks and increments its own quiescent state counter to one greater than the neighbor's value, thereby moving the discontinuity in counter values to itself. By way of example, at time t=0 in FIG. 7, processor 3 that has the lowest quiescent state counter value (1) sees a discontinuous counter value (4) at processor 0. This signifies to processor 3 that there have been three (4−1) quiescent states experienced by its peer processors since processor 3's last grace period. Processor 3 thus concludes that a new grace period has elapsed and that it now has the grace period token. It performs callback processing and sets its quiescent state counter value to 4+1=5. At time t=1, processor 2, having a quiescent state counter value of 2, now sees the discontinuous counter value 5 at processor 3. It determines that it has the grace period token, performs callback processing, and sets its counter value to 5+1=6. Continuing this sequence, processor 1 obtains the grace period token at time t=2 and processor 0 obtains the token at time t=3. At time t=4, the token returns to processor 3 and the pattern repeats. As can be seen by the shaded table entries in FIG. 7, and as additionally shown in the token-passing diagram of FIG. 8, processors 0-3 will obtain the token (shown by the circle labeled "T" in FIG. 8) at the following times: 1) processor 3 will obtain the token at times t=0, 4 and 8; 2) processor 2 will obtain the token at times t=1 and 5; 3) processor 3 will obtain the token at times t=2 and 6; and 4) processor 0 will obtain the token at times t=3 and 7.

As also described by way of background above, prior art implementations of read-copy update seek to avoid unnecessary token processing by manipulating a global variable that serves as a shared indicator of whether there are pending callbacks in the read-copy update subsystem that require processing. For example, as disclosed in P. McKenney et al., "Read Copy Update," Ottawa Linux Symposium (2002), a Linux implementation of read-copy update known as "rcu-sched" uses a shared variable "rcu_pending" that represents a count of the number of pending callbacks in the read-copy update subsystem. The Linux atomic increment primitive "atomic_inc" is invoked to increment rcu_pending when a new callback is registered by way of the function call "atomic_inc(&rcu_pending)." The Linux atomic decrement primitive "atomic_dec" is then invoked to decrement rcu_pending after the callback is processed by way of the function call "atomic_dec(&rcu_pending)." It should also be pointed out that "rcu-sched" is an example of a read-copy update implementation that uses a counter-based grace period token passing scheme as shown in FIGS. 7 and 8.

Figure 6:
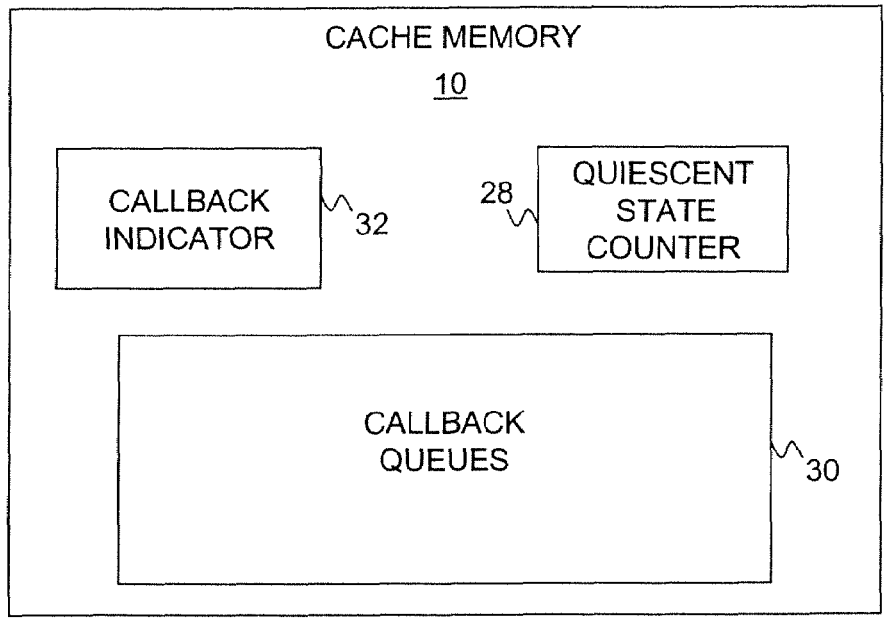
FIG. 6 is a functional block diagram showing a cache memory associated with each processor in the multiprocessor computer system of FIG. 4.

In order to avoid the disadvantages associated with the use of atomic operations (or other concurrency control mechanisms) to increment and decrement a shared indicator of callback pendency, the present invention proposes an alternative approach. As shown in FIG. 6, a distributed callback indicator 32 can be maintained in the cache memory 10 of each of the processors $4_1, 4_2 \ldots 4_n$ and manipulated as a local variable to reflect changes in the read-copy update subsystem 20. Each distributed callback indicator 32 provides a representation of the state of the read-copy update subsystem 20. An associated callback indicator handling mechanism 34 (shown in FIG. 5) within each of the read-copy update subsystem instances $20_1, 20_2 \ldots 20_n$ can then consult the local distributed callback indicator 32 to determine whether grace period token processing is required. The local distributed callback indicator 32 may show that the read-copy update subsystem is idle, in which case the token does not need to be passed. On the other hand, the local distributed callback indicator 32 may show that there are callbacks pending in the read-copy update subsystem, and that grace period token processing is required at the current processor.

In order to keep the distributed callback indicators 32 current as conditions change within the read-copy update subsystem 20, a propagation technique that is somewhat analogous to the grace period token passing scheme of FIGS. 7 and 8 may be used. Other implementations would also be possible. According to the propagation technique, as each of the processors $4_1, 4_2 \ldots 4_n$ passes through a quiescent state, its callback indicator handling mechanism 34 consults the distributed callback indicator 32 of a neighbor processor and adjusts its own local callback indicator according to the neighbor's value, coupled with consideration of the local callback history since the current processor's last grace period.

In one embodiment of the invention, the distributed callback indicator 32 is implemented as a per-processor counter of the number of processors having pending callbacks. These processors may be referred to as "callback processors," and the distributed callback indicator 32 may be thought of as a callback processor counter. To manipulate this counter, a processor checks to see if there has been any change in its local callback state since this processor's last grace period. If no change has occurred, the current processor's counter will be set to the same value as a neighbor processor's counter. If a processor's callback history shows that no local callbacks were registered the last time the grace period token left this processor, but a requisite number of new local callbacks have been registered since the last grace period, the current processor's counter will be incremented to one higher than the value of the neighbor processor's counter. If a processor's callback history shows that local callbacks were registered the last time the grace period token left this processor, but a requisite number of new local callbacks have not been registered since the last grace period, the current processor's counter will be decremented so as to be one lower than the value of the neighbor processor's counter.

In a second embodiment of the invention, the distributed callback indicator 32 is implemented to track an indication of the total number of pending callbacks. In that case, the distributed callback indicator 32 can be thought of as a callback counter. To manipulate this counter, a processor compares the number of local callbacks that have been registered since this processor's last grace period to the number of local callbacks that were registered the last time the grace period token left the processor. The current processor's counter is set to the value of a neighbor processor's counter with an adjustment to reflect the net gain or loss of local callbacks.

In a third embodiment of the invention, the distributed callback indicator 32 is implemented as a bitmap identifying processors that have pending callbacks. To manipulate the bitmap, a processor determines if there are a requisite number of local callbacks that have been registered since the last time the grace period token left this processor. If there are, the current processor's bitmap is set to correspond to a neighbor processor's bitmap, but with the current processor's bit set to 1. Otherwise, if a requisite number of local callbacks have not been registered since the last grace period, the current processor' bit value in the bit map is set to zero. One disadvantage of this implementation is that it does not gracefully handle large numbers of processors due to need to process correspondingly large bitmaps.

Figure 9:
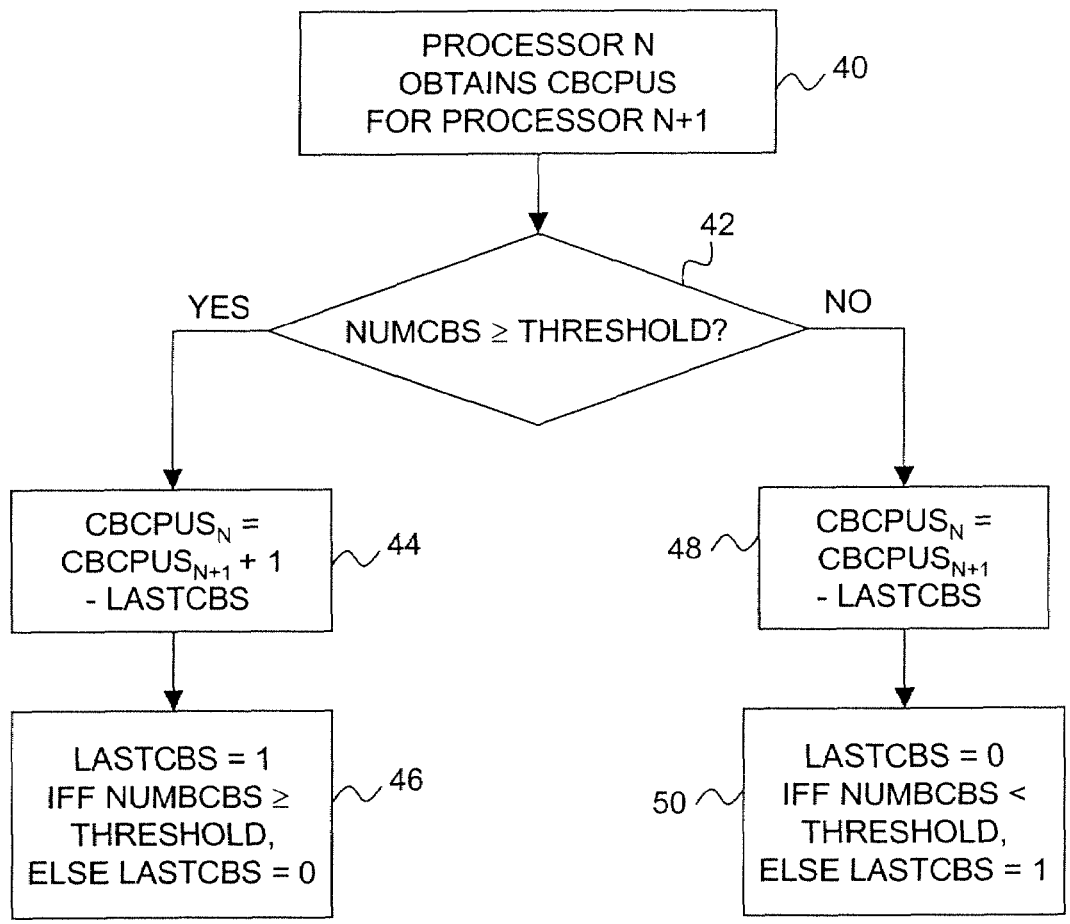
FIG. 9 is a flow diagram showing the manipulation of a distributed callback indicator implemented as a count of processors having pending callbacks.

FIG. 9 illustrates an exemplary sequence of processing steps that may be performed according to the first above-described embodiment in which the distributed callback indicator 32 is, by way of example only, a count of the number of processors $4_1$, $4_2$ . . . $4_n$ that have pending callbacks. The process of FIG. 9 uses a per-processor local variable called "cbcpus" (shorthand for "callback cpus") as the distributed callback indicator. This variable is a count of processors having callbacks needing processing. Another per-processor local variable, called "lastcbs" (shorthand for "last callbacks"), is a flag indicating whether the current processor had callbacks registered the last time the grace period token left this processor. A third per-processor variable, called "numcbs" (shorthand for "number of callbacks") is a count of the number of callbacks registered at the current processor since the last grace period. Note that the foregoing variable names are used for illustration purposes only.

In step 40 of FIG. 9, the nth processor's callback indicator handling mechanism 34 obtains the value of cbcpus of the processor n+1 (processor n−1 could also be used depending on the desired propagation direction). In step 42, processor n determines if there are any new callbacks (numcbs) that meet the criteria for starting a grace period. In some cases, the presence of a single callback will satisfy these criteria. In other cases, it may be desirable to batch process callbacks by establishing a callback threshold specifying the number of callbacks necessary to start a grace period, and an elapsed time threshold that triggers callback processing even if the callback threshold is not reached. If in step 42 there are new callbacks requiring processing, then in step 44 the current processor's value of cbcpus is set to one greater than the neighbor processor's value of cbcpus, less the current processor's value of lastcbs. The value of lastcbs is then set to 1 in step 46 if and only if the callbacks on the current processor meet the criteria for starting a grace period. If in step 42 there are no new callbacks requiring processing, then in step 48 the current processor's value of cbcpus is set equal to the neighbor processor's value of cbcpus, less the current processor's value of lastcbs. The value of lastcbs is then set to 0 in step 50 if and only if there are no new callbacks on the current processor that meet the criteria for starting a grace period.

Figures 10, 11:
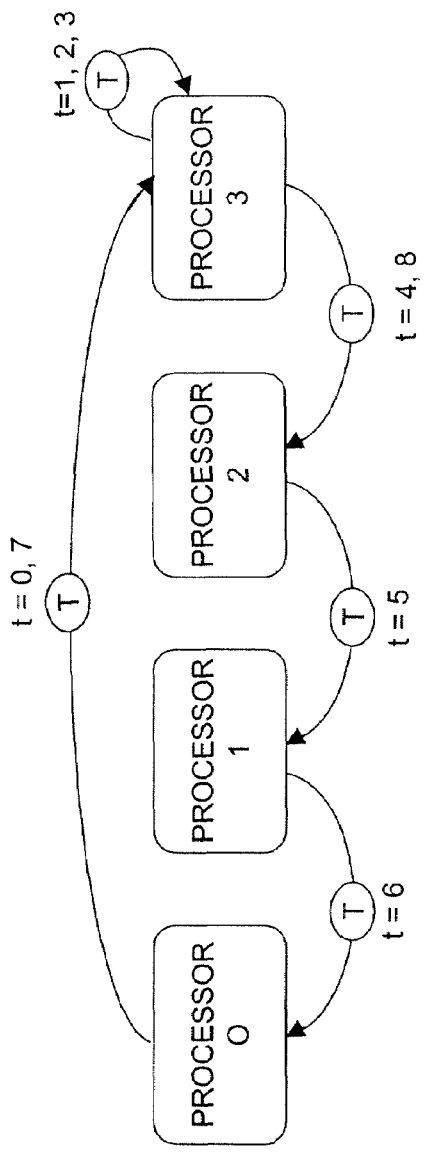
FIG. 10 is a table showing exemplary quiescent state counter values and distributed callback indicator values in a hypothetical four-processor data processing system implementing read-copy update.
FIG. 11 is a functional block diagram showing the four processors of FIG. 10 as they pass a grace period token from time to time during read-copy update processing.

As each processor performs the foregoing processing while passing through a quiescent state, changes due to the registration of new callbacks or the processing of old callbacks will be quickly reflected by each of the distributed callback indicators (cbcpus in this example). By testing the propagated distributed callback indicator at each processor, potentially expensive token processing can be avoided when there are not enough callbacks warranting grace period token circulation. The table of FIG. 10 is illustrative of such processing in an exemplary four-processor system. FIG. 10 is based on FIG. 7 but shows, for each processor 0, 1, 2, and 3, both a grace period token on the left side of each table element and a distributed callback indicator (cbcpus in this example) on the right side of each table element. The shaded cells again indicate that the corresponding processor is the owner of the grace period token. In each case, the owner is the processor whose quiescent state counter has the smallest value and whose neighbor has a counter value representing a discontinuity relative to the token owner's counter value.

In FIG. 10, processor 3 receives the grace period token from processor 0. However, no token processing takes place because processor 3's distributed callback indicator has a value of 0. In the current example in which the distributed callback indicator 32 is a count of callback processors (cbcpus), the 0 value means there are no processors having a requisite number of callbacks warranting processing. Processor 3 thus determines that the read-copy update subsystem for this group of processors is idle. At time t=1 in FIG. 10, processor 2 determines that it has had new callback activity and sets its distributed callback indicator to a value of 1. Processor 3 is unaffected (since it only looks to processor 0 for callback indicator activity according to the current example) and again performs no grace period token processing. At time t=2, processor 2's distributed callback indicator value is propagated to processor 1. Processor 3 is unaffected and again performs no grace period token processing. At time t=3, processor 1's distributed callback indicator value has propagated to processor 0. Processor 3 is unaffected and again performs no grace period token processing. At time t=4, processor 0's distributed callback indicator value has been propagated to processor 3, causing it to perform grace period token processing and pass the token to processor 2. At time t=5, processor 2 has performed grace period token processing and passed the token to processor 1. At time t=6, processor 1 has performed grace period token processing and passed the token to processor 0. In addition, it is assumed that processor 2 has determined that its callbacks have been processed and set its distributed callback indicator to 0. At time t=7, processor 0 has performed grace period token processing and passed the token to processor 3. In addition, processor 2's distributed callback indicator has been propagated to processor 1. At time t=8, processor 3 has performed grace period token processing and passed the token to processor 2. In addition, processor 1's distributed callback indicator has been propagated to processor 0. Assuming no new callbacks are registered in the system of FIG. 9, the grace period token will now idle at processor 2 because its distributed callback indicator is 0.

FIG. 11 summarizes the foregoing processing. It shows that processor 3 will obtain the token (T) at times t=0, 7. The token will then idle at processor 3 during times t=1, 2 and 3. Processor 2 will then obtain the token at times 4, 8. Processor 1 will obtain the token at time t=5. Processor 0 will obtain the processor at time t=6.

Figure 12:
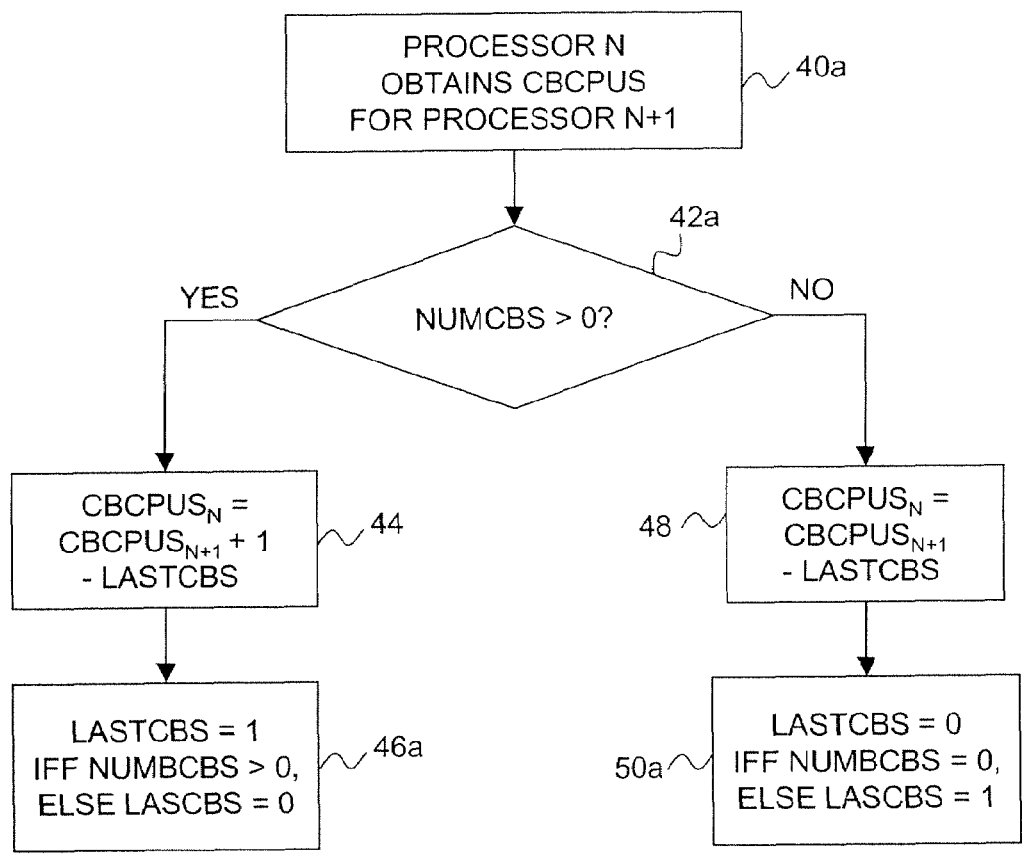
FIG. 12 is a flow diagram representing a modification of the flow diagram of FIG. 9.

Turning now to FIG. 12, an alternative to the distributed callback indicator processing of FIG. 9 is shown. According to this alternative approach, step 42a (corresponding to step 42 of FIG. 9) inquires whether numbcbs is nonzero, without regard to whether a threshold has been reached. Step 46a (corresponding to step 46 of FIG. 9) sets lastcbs to 1 if and only numcbs is greater than 0. Step 50a (corresponding to step 50 of FIG. 9) sets lastcbs to 0 if and only numcbs is 0. The advantage of this alternative approach is that it permits processors with only a few callbacks to "piggyback" their callback processing needs onto another processor's grace period token circulation and keep the token moving. The disadvantage is that additional grace period detection operations can result.

Figure 13:
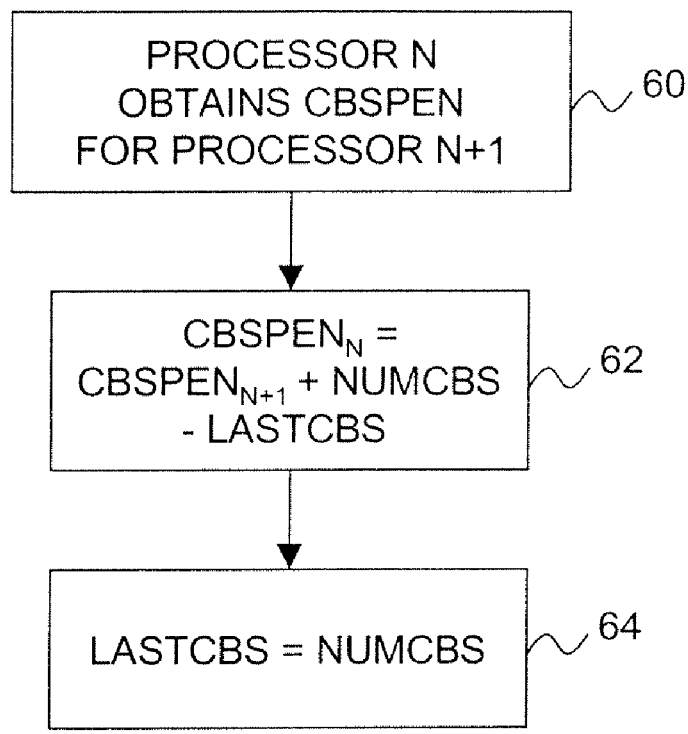
FIG. 13 is a flow diagram showing the manipulation of a distributed callback indicator implemented as a count of pending callbacks.

FIG. 13 illustrates an exemplary sequence of processing steps that may be performed according to the second above-described embodiment in which the distributed callback indicator 32 is, by way of example only, a count of the number of pending callbacks. The process of FIG. 13 uses a per-processor local variable called "cbspen" (shorthand for "callbacks pending") as the distributed callback indicator. Another per-processor local variable, called "lastcbs" (shorthand for "last callbacks"), is a value indicating the number of callbacks that the current processor had registered the last time the grace period token left this processor. A third per-processor variable, called "numcbs" (shorthand for "number of callbacks") is a count of the number of callbacks registered at the current processor since the last grace period. Note that the foregoing variable names are used for illustration purposes only.

In step 60 of FIG. 13, the nth processor's callback indicator handling mechanism 34 obtains the value of cbspen of the processor n+1 (processor n−1 could also be used depending on the desired propagation direction). In step 62, the current processor's value of cbspen is set to the neighbor processor's value of cbspen, plus the current processor's value of numcbs, less the current processor's value of lastcbs. The value of lastcbs is then set to numcbs in step 64.

Figure 14:
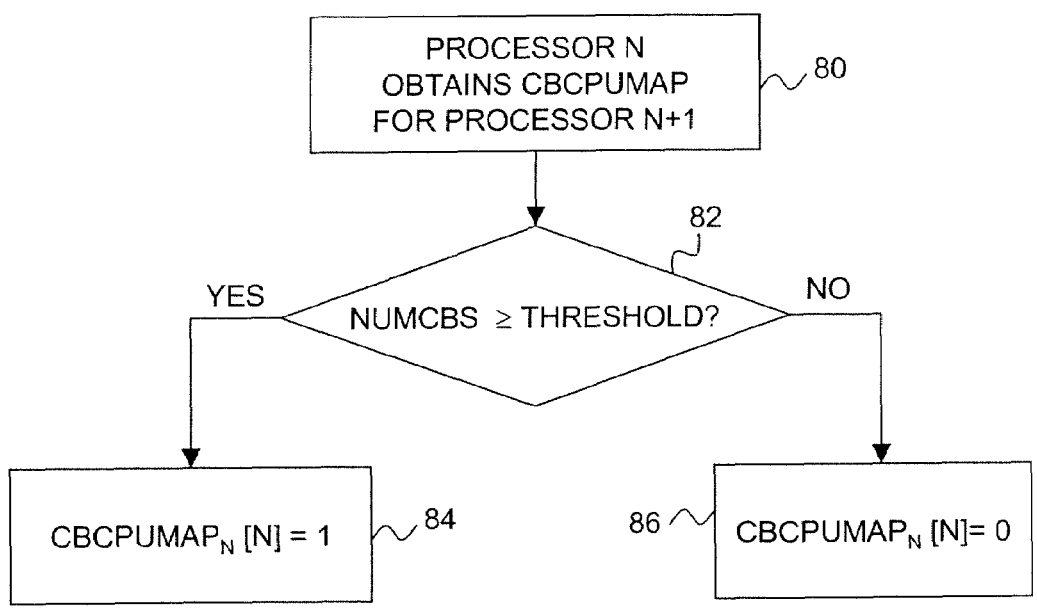
FIG. 14 is a flow diagram showing the manipulation of a distributed callback indicator implemented as a bitmap identifying processors having pending callbacks.

FIG. 14 illustrates an exemplary sequence of processing steps that may be performed according to the third above-described embodiment in which the distributed callback indicator 32 is, by way of example only, a bit map showing which processors have pending callbacks. The process of FIG. 14 uses a per-processor local bitmap variable called "cbcpumap" (shorthand for "callback cpu map") as the distributed callback indicator. Another per-processor local variable, called "numcbs" (shorthand for "number of callbacks") is a count of the number of callbacks registered at the current processor since the last grace period. Note that the foregoing variable names are used for illustration purposes only.

In step 80 of FIG. 14, the nth processor's callback indicator handling mechanism 34 obtains the value of cbcpumap of the processor n+1 (processor n−1 could also be used depending on the desired propagation direction). In step 82, processor n determines if there are any new callbacks (numcbs) registered at this processor that satisfy some established threshold (e.g., as discussed above relative to FIG. 9). If in step 82 there are new callbacks requiring processing, then in step 84 the current processor's cpcumap is set equal to that of processor n+1, but the nth bit of cbcpumap is set to 1. If in step 82 there are no new callbacks requiring processing, then in step 86 the current processor's value of cpcpumap is set equal to that of processor n+1, but the nth bit of cbcpumap is set to 0.

Figure 15:
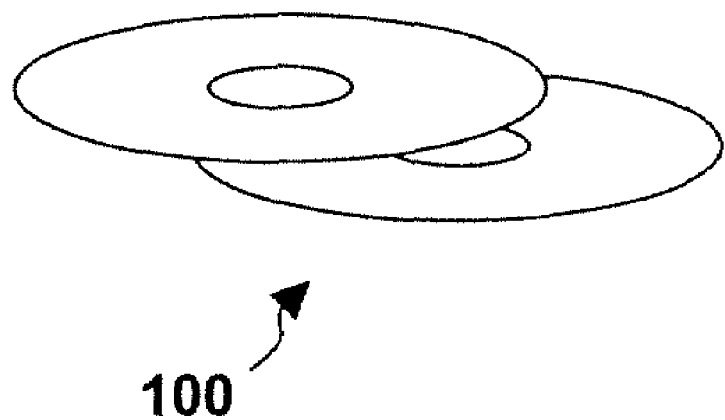
FIG. 15 is a diagrammatic illustration of storage media that can be used to store a computer program product for implementing read-copy update grace period detection functions in accordance with the invention.

Accordingly, a technique for read-copy update grace period detection has been disclosed that does not require atomic instructions and which can be implemented to gracefully handle large numbers of processors. It will be appreciated that the foregoing concepts may be variously embodied in any of a data processing system, a machine implemented method, and a computer program product in which programming means are recorded on one or more data storage media for use in controlling a data processing system to perform the required functions. Exemplary data storage media for storing such programming means are shown by reference numeral 100 in FIG. 15. The media 100 are shown as being portable optical storage disks of the type that are conventionally used for commercial software sales. Such media can store the programming means of the invention either alone or in conjunction with an operating system or other software product that incorporates read-copy update functionality. The programming means could also be stored on portable magnetic media (such as floppy disks, flash memory sticks, etc.) or on magnetic media combined with drive systems (e.g. disk drives) incorporated in computer platforms.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A data processing system having one or more processors, a memory and a communication pathway between the one or more processors and the memory, said system being adapted to avoid unnecessary grace period token processing while detecting a grace period for deferring a removal by one of said processors of a shared data element until pre-existing references to the data element maintained by other of said processors are removed, and comprising:

a token to be circulated between said processors;

a token manipulator associated with each of said processors adapted to circulate said token and determine whether said grace period has elapsed by virtue of said token making a round trip through said processors;

a distributed indicator associated with each of said processors that is indicative of whether there is a need to perform removal processing at any of said processors relative to any data element shared by said processors;

a distributed indicator handling mechanism associated with each of said processors adapted to process said distributed indicator before token processing by said token manipulator; and said distributed indicator handling mechanisms being further adapted to permit said token manipulators to performing token processing at said processors only when warranted by said distributed indicator.

2. The system of claim 1 wherein each of said distributed indicators is stored as a local variable in a cache memory associated with one of said processors.

3. The system of claim 1 wherein said distributed indicators represent a number of said processors that have pending requests to remove data elements shared by said processors.

4. The system of claim 1 wherein said distributed indicators represent a number of pending requests to remove data elements shared by said processors.

5. The system of claim 1 wherein said distributed indicators represent a bit map identifying said processors that have pending requests to remove data elements shared by said processors.

6. The system of claim 1 wherein said distributed indicator handling mechanisms are adapted to propagate a change made to one of said distributed indicators at one of said processors to other ones of said processors.

7. The system of claim 1 wherein a value of one of said distributed indicators at first one of said processors reflects a value of a second one of said distributed indicators at a neighboring second one of said processors adjusted as necessary to reflect data element removal request activity at said first one of said processors.

8. The system of claim 1 wherein said distributed indicator handling mechanisms are adapted to process said distributed indicator by determining whether there are a threshold number of pending data element removal requests at one of said processors to warrant circulation of said token.

9. The system of claim 1 wherein said distributed indicator handling mechanisms are adapted to process said distributed indicators by determining whether there any pending data element removal requests at one of said processors.

10. The system of claim 1 wherein said token, said token manipulator, said distributed indicator, and said distributed indicator handling mechanism are implemented as part of a read-copy update subsystem, said data element removals are implemented by registering callbacks at said processors, and said distributed indicator is a distributed callback indicator reflecting callback activity in said read-copy update subsystem.

11. A computer program product for avoiding unnecessary grace period token processing while detecting a grace period for deferring removal of a shared data element until pre-existing references to the data element are removed, comprising:

one or more data storage media;
programming means recorded on said data storage media for programming a data processing platform to operate as by:
establishing a token to be circulated between processing entities sharing access to said data element;
said token being indicative of a grace period having elapsed when said token makes a round trip through said processing entities;
associating a distributed indicator with each of said processing entities that is indicative of whether there is a need to perform removal processing at any of said processing entities relative to any data element shared by said processing entities;
processing said distributed indicator at each of said processing entities before engaging in token processing at said processing entities; and
performing token processing at said processing entities only when warranted by said distributed indicator.

12. The computer program product of claim 11 wherein each of said distributed indicators is stored as a local variable in a cache memory associated with one of said processing entities.

13. The computer program product of claim 11 wherein said distributed indicators represent a number of said processing entities that have pending requests to remove data elements shared by said processing entities.

14. The computer program product of claim 11 wherein said distributed indicators represent a number of pending requests to remove data elements shared by said processing entities.

15. The computer program product of claim 11 wherein said distributed indicators represent a bit map identifying said processing entities that have pending requests to remove data elements shared by said processing entities.

16. The computer program product of claim 11 wherein a change made to one of said distributed indicators at one of said processing entities is propagated to other ones of said processing entities.

17. The computer program product the claim 11 wherein a value of one of said distributed indicators at first one of said processing entities reflects a value of a second one of said distributed indicators at a neighboring second one of said processing entities adjusted as necessary to reflect data element removal request activity at said first one of said processing entities.

18. The computer program product of claim 11 wherein said processing of said distributed indicator includes determining whether there are a threshold number of pending data element removal requests at one of said processing entities to warrant circulation of said token.

19. The computer program product of claim 11 wherein said processing of said distributed indicator includes determining whether there any pending data element removal requests at one of said processing entities.

20. The computer program product of claim 11 wherein said programming means are implemented as part of a read-copy update subsystem computer program product, said data element removals are implemented by registering callbacks at said processing entities, and said distributed indicator is a distributed callback indicator reflecting callback activity in said read-copy update subsystem.

21. A data processing system having one or more processors, a memory and a communication pathway between the one or more processors and the memory, said system including a read-copy update subsystem adapted to avoid unnecessary grace period token processing while detecting a grace period to determine when pending callbacks may be executed, and comprising:

means for implementing a quiescent state counter at each of a set of processors sharing access to said a data element;
means for establishing a grace period token as a discontinuity in count values maintained by said quiescent state counters;
said token being indicative of a grace period having elapsed at one of said processors when said token makes a round trip through said set of processors to return to said one of said processors;
means for associating a distributed callback indicator as a local variable in a cache memory associated with each of said processors that is indicative of whether there is a need to process said callbacks at any of said processors;
means for processing said distributed callback indicator at each of said processors before engaging in token processing at said processors; and
means for performing token processing at said processors only when warranted by said distributed callback indicator.

* * * * *